US012526644B2

United States Patent
Aygül et al.

(10) Patent No.: US 12,526,644 B2
(45) Date of Patent: Jan. 13, 2026

(54) LEARNING-BASED SPECTRUM OCCUPANCY PREDICTION EXPLOITING MULTI-DIMENSIONAL CORRELATION

(71) Applicant: Vestel Elektronik Sanayi ve Ticaret A. S., Manisa (TR)

(72) Inventors: Mehmet Ali Aygül, Istanbul (TR); Mahmoud Nazzal, Istanbul (TR); Hüseyin Arslan, Istanbul (TR)

(73) Assignee: Vestel Elektronik Sanayi ve Ticaret A. S., Manisa (TR)

(*) Notice: Subject to any disclaimer, the term of this patent is extended or adjusted under 35 U.S.C. 154(b) by 343 days.

(21) Appl. No.: 18/249,789

(22) PCT Filed: Oct. 12, 2021

(86) PCT No.: PCT/EP2021/078119
§ 371 (c)(1),
(2) Date: Apr. 20, 2023

(87) PCT Pub. No.: WO2022/084096
PCT Pub. Date: Apr. 28, 2022

(65) Prior Publication Data
US 2023/0388809 A1 Nov. 30, 2023

(30) Foreign Application Priority Data

Oct. 23, 2020 (EP) .................................... 20203675

(51) Int. Cl.
*H04W 16/14* (2009.01)
*H04B 17/391* (2015.01)
(Continued)

(52) U.S. Cl.
CPC ........ *H04W 16/14* (2013.01); *H04B 17/3912* (2015.01); *H04L 41/16* (2013.01); *H04W 16/22* (2013.01)

(58) Field of Classification Search
CPC ........... H04W 72/0453; H04W 72/044; H04W 16/14; H04W 72/0446; H04W 16/22;
(Continued)

(56) References Cited

U.S. PATENT DOCUMENTS

2019/0364433 A1* 11/2019 Das .................. G06N 5/045
2020/0186430 A1* 6/2020 Halepovic ............. H04L 43/062
(Continued)

FOREIGN PATENT DOCUMENTS

| CN | 102362435 A | 2/2012 |
| CN | 109245840 A | 1/2019 |
| CN | 109450567 A | 3/2019 |

OTHER PUBLICATIONS

Shaghluf, "Cooperative spectrum prediction for improved efficiency of cognitive radio networks", Master's thesis, University of Victoria, Victoria, British Columbia, Jan. 18, 2018.
(Continued)

*Primary Examiner* — Phong La
(74) *Attorney, Agent, or Firm* — The Webb Law Firm (57) ABSTRACT

The present disclosure relates to a spectrum occupancy prediction, which employs a first trainable module and a second trainable module. The first and the second trainable modules predict spectrum occupancy at a respective first and second communication devices based on past occupancies and/or occupancies in adjacent subband(s). The prediction from the first trainable module and the second trainable module is input to a trainable output (third) module, which then provides the spectrum occupancy prediction.

15 Claims, 5 Drawing Sheets

(51) Int. Cl.
*H04L 41/16* (2022.01)
*H04W 16/22* (2009.01)

(58) Field of Classification Search
CPC . H04W 16/24; H04B 17/3912; H04B 17/391; H04B 17/3913; H04L 41/16; H04L 41/40; H04L 41/391
See application file for complete search history.

(56) References Cited

U.S. PATENT DOCUMENTS

| | | | | |
|---|---|---|---|---|
| 2020/0304378 | A1* | 9/2020 | Choi | H04L 41/0806 |
| 2021/0345120 | A1* | 11/2021 | Montalvo | G06N 3/02 |
| 2023/0388809 | A1* | 11/2023 | Aygül | H04L 41/16 |

OTHER PUBLICATIONS

Aygul et al., "Spectrum Occupancy Prediction Exploiting Time and Frequency Correlations Through 2D-LSTM", 2020 IEEE 91st Vehicular Technology Conference, 2020, pp. 1-5.

Li et al., "Online Spectrum Prediction With Adaptive Threshold Quantization", IEEE Access, 2019, vol. 7, pp. 174325-174334.

Shaghluf et al., "Spectrum and energy efficiency of cooperative spectrum prediction in cognitive radio networks", Wireless Networks, 2018, vol. 25:6, pp. 3265-3274.

Yu et al., "Spectrum Availability Prediction in Cognitive Aerospace Communications: A Deep Learning Perspective", IEEE Explore, 2017, pp. 1-4.

Annonomous, "Channel state estimation based on prior channel information", 3GPP TSG RAN WG1 Meeting #102-e, R1-2005465, e-Meeting, Aug. 17-Aug. 28, 2020, pp. 1-3.

Chen et al., "A support vector machine based spectrum sensing for cognitive radios", Journal of Chongqing University of Posts and Telecommunications (Natural Science Edition), 2019, vol. 31:3, pp. 10, (English-language Abstract).

Shaghluf et al., "Spectrum and energy efficiency of cooperative spectrum prediction in cognitive radio networks", Wireless Networks, 2019, pp. 3265-3274.

* cited by examiner

LEARNING-BASED SPECTRUM OCCUPANCY PREDICTION EXPLOITING MULTI-DIMENSIONAL CORRELATION

CROSS-REFERENCE TO RELATED APPLICATIONS

This application is the United States national phase of International Application No. PCT/EP2021/078119 filed Oct. 12, 2021, and claims priority to European Patent Application No. 20203675.2 filed Oct. 23, 2020, the disclosures of each of which are hereby incorporated by reference in their entireties.

BACKGROUND

Field

The present disclosure relates to predicting spectrum occupancy for a wireless communication system.

Technical Considerations

Cognitive radio is one of the emerging technologies for exploiting the system spectrum. Cognitive radio devices are supposed to dynamically use the best wireless channels in their vicinity to improve spectrum efficiency. In order to achieve this, spectrum occupancy information is necessary to help modeling and predicting the spectrum availability for efficient dynamic spectrum access.

Spectrum occupancy prediction may be based on using the information on previous spectrum occupancy to predict future occupancy. Such a prediction is based on exploiting the inherent correlation between past and future occupancies. Some approaches exploit time-domain correlation and thus cast spectrum prediction as a time-series prediction. Some approaches additionally consider exploiting the correlation along the frequency axis, and thus exploit time-frequency correlation. Correlation may also exist in the spatial domain. Thus, exploiting the correlation in all mentioned domains may be desirable. However, for practical implementations, it would be desirable to take into account the complexity and requirements of the spectrum occupancy prediction.

SUMMARY

The present subject matter relates to methods and apparatuses for spectrum occupancy prediction in wireless communication systems such as wireless local area networks or mobile communication networks or the like.

In particular, some embodiments of the present disclosure relate to spectrum occupancy prediction, which provides individual trainable models (corresponding to modules) for prediction of spectral occupancy based on past occupancies at a plurality of communication devices and a trainable model for estimating the spectrum occupancy based on the predictions provided by the plurality of the devices.

According to some embodiments, a method is provided for prediction of spectrum occupancy comprising: predicting, by applying a first trainable module, a first likelihood of spectrum occupancy in a wireless bandwidth based on past spectrum occupancy related to a first communication device, predicting, by applying a second trainable module, a second likelihood of spectrum occupancy in the wireless bandwidth based on past spectrum occupancy related to a second communication device, predicting, by applying a trainable output module, spectrum occupancy in the wireless bandwidth based on the first likelihood and the second likelihood.

According to some embodiments, a method is provided for training of a predictor for prediction of spectrum occupancy, the model comprising N trainable modules and a trainable output module, wherein the method comprises: obtaining, for each q being 1 to N with N being an integer larger than 1, a q-th pair of spectrum occupancy likelihood in a wireless bandwidth related to a q-th communication device and a ground-truth spectrum occupancy in the wireless bandwidth; training each q-th trainable module among N trainable modules with the q-th pair; and training the trainable output module with the outputs of the N trainable modules and the ground-truth spectrum occupancy.

According to some embodiments, a device is provided for prediction of spectrum occupancy comprising: a first trainable module for predicting a first likelihood of spectrum occupancy in a wireless bandwidth based on past spectrum occupancy related to a first communication device, a second trainable module for predicting a second likelihood of spectrum occupancy in the wireless bandwidth based on past spectrum occupancy related to a second communication device, a trainable output module for predicting spectrum occupancy in the wireless bandwidth based on the first likelihood and the second likelihood.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

An understanding of the nature and advantages of various embodiments may be realized by reference to the following figures.

Like reference numbers and symbols in the various figures indicate like elements, in accordance with certain example implementations.

DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Accommodating growing data traffic is one among many challenges for communication systems such as mobile communications systems of the fifth-generation (5G) and beyond. In 5G networks, data rates are estimated to be multiplied by ten compared to the fourth-generation, and latency should decrease to one millisecond or even less. The ever-increasing demand on higher rate communications causes an inherent gap between this requirement and the scarcity of the available spectrum. Similar situations may occur in wireless local area networks (WLANs). Cognitive radio is believed to be one of the key solutions to bridge the gap. Cognitive radio enables secondary users (SUs) to opportunistically use available spectrum bands (referred to as spectrum holes) unused by primary users (PUs).

Spectrum prediction is an alternative to continuous spectrum sensing, where future occupancies are predicted based on previous occupancies. This alternative substantially saves the computation, energy, and time overheads required by continuous spectrum sensing. As mentioned above, there are various spectrum occupancy prediction approaches. Early works used classical statistical prediction methods to predict spectrum occupancy. Examples comprise using an exponential moving average model, an autoregressive model (ARM), and a Bayesian inference (BIF) method through a hidden Markov model. More recently, correlation in frequency has also been exploited to improve the spectrum prediction performance.

Moreover, spectrum occupancy is also correlated in the spatial domain. Therefore, it is advantageous to exploit spectrum correlations in the dimensions of time, frequency and space to improve the quality of spectrum occupancy prediction. Recent literature views spectrum occupancy as a non-stationary process. However, the aforementioned techniques may not always be capable of addressing this issue. This incapability is more strongly aggravated with the increased user mobility and diverse user types envisaged in 5G and beyond. Although the aforementioned approaches may be useful in the analysis of numerous cases, they do not provide a possibility for a detailed analysis of the multi-dimensional attributes and non-stationary characteristics of wireless signals. Jointly exploiting multi-dimensional (time, frequency, and space) correlations provides a possible perspective for spectrum prediction.

One of the possibilities of simultaneously exploiting multidimensional correlation in spectrum occupancy prediction is tensor completion. For example, spectrum occupancy prediction may be converted into a third-order tensor completion problem to account for exploiting time, frequency and space correlations. This approach achieved one-day-long predictions with a reasonable error margin. Other approaches employ long-short term memory (LSTM) recurrent neural networks or convolutional networks for prediction.

Although tensor models provide a rich and powerful representation of three-dimensional (3D) shapes, including important details, they share some common drawbacks. Such models may require high processing time and high computational complexity, which may not be attained in real-time applications. They usually assume that the 3D data is continuously available at any time. However, sometimes, it may be difficult to obtain information, e.g., from all of the participating base stations (BSs). For example, information from a certain BS may be absent for various reasons. For instance, in the case of cognitive radio (CR) security threats (such as a primary user emulation attack or a jamming attack), the provision of accurate information about spectrum occupancy from some BS(s) may not be possible. As another example, in case of a natural disaster, the information flow from some BSs may be interrupted or lost. Therefore, an assumption of the availability of the 3D information is not always valid and realistic. Furthermore, tensor analysis may require handling many parameters. This may not be suited with mobile devices and may require on-the-cloud computation with its traffic overhead and security vulnerabilities. Thus, the use of tensor analysis does not promote compact modeling.

To compensate for the aforementioned effects, more adaptive and flexible methods are desirable. In this regard, an attractive advantage of spectral occupancy prediction may be a setting in which it is not required to re-train the whole model once any element in the model fails to provide its information. It would be advantageous if such element (e.g., base station) where information is temporarily removed from the model, and only an end-classifier, which will give the last decision about spectrum occupancy can be re-trained.

In some embodiments, a trainable model is provided which has a first type of model trainable for time and/or frequency correlation. Such a model can be provided per network element such as base station and may be trained for predicting spectrum occupancy of that network element. Moreover, there may be a second type of mode trainable for spatial correlation, having as an input the output of the first type model(s). This architecture may provide for advantages such as the re-trainability mentioned above—in case a network element is inactive or in failure, its contribution to the spectrum availability may be omitted and the remaining first type model will not require re-training. A re-training may be performed for the second-type model. However, it is noted that a re-training may not be necessary, in case pre-trained parameters of the second-type model are pre-stored for such cases. Thus, the above-mentioned model may reduce complexity and provide versatility.

Figure 1:
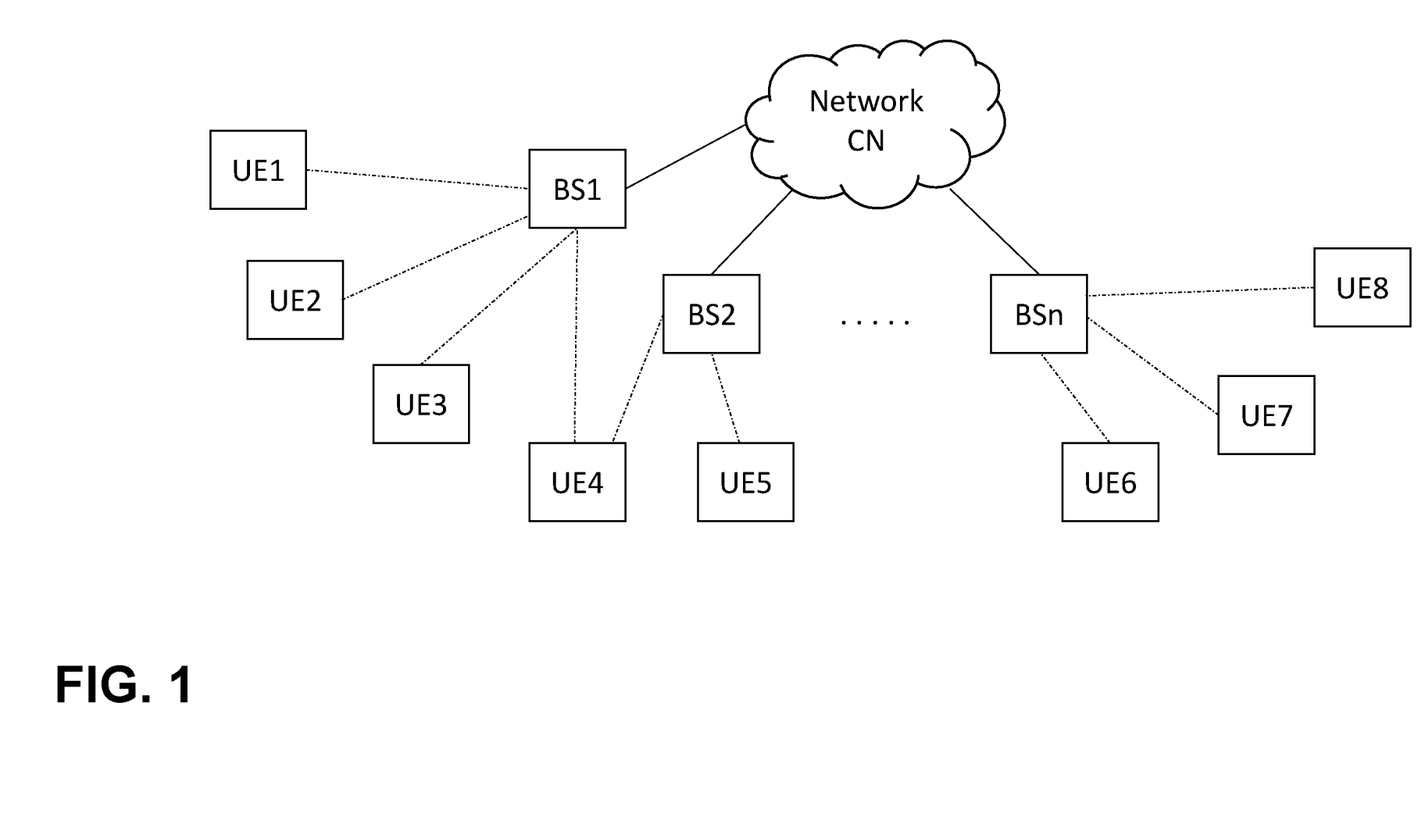
FIG. 1 is a schematic drawing illustrating a system including a plurality of base stations and a network.

FIG. 1 illustrates an exemplary system in which the spectrum occupancy may be employed. The system comprises a plurality of base stations: BS1 to BSn. It is noted that the term base station herein may refer to a base station such as the eNB of Long-Term Evolution (LTE) or the gNB of New Radio (NR) or a base station of any mobile, e.g., cellular, communication system. However, the base station may also be an access point of a wireless local area network (WLAN). In general, a base station is a network element providing access to other communication peers for terminals UE1 to UE8. In the example of FIG. 1, base station BS1 serves UE1 to UE4. Base station BS2 serves UE4 and UE5. In this example, UE4 is served by two base stations. However, the present disclosure may also be applicable to cases in which a UE can be served only by a single BS at a time. Moreover, base station BSn serves UE6 to UE8.

Base stations BS1 to BSn in this example are connected to a core network. This may be a core network such as 4G (LTE) or 5G (NR) core network or it may be an internet to which an AP in a WLAN is connected. It is noted that the present disclosure is also applicable to network architectures without a network such as a core network and may be applied to systems in which there are base stations interconnected with each other (fully or partially). The system may enable operation on certain frequency resources (e.g., licensed or unlicensed spectrum available at the given location). Each BS may manage some portion of the resources such as time-frequency resources. There may be BSs with overlapping (fully or partially) spatio-frequency spectrum access.

The above-mentioned spectrum occupancy prediction may be implemented within any device which does not necessarily have to be a base station, a UE or other network entity. Some embodiments of the present disclosure comprise distributed solutions in which the first-type trainable modules and the second-type trainable module(s) are implemented by mutually different devices. However, the present disclosure is also readily applicable to be implemented, e.g., by a base station or a base station controlling entity or by an access point also controlling AP coordination or by any AP, or by a UE or STA, or the like.

Figure 2:
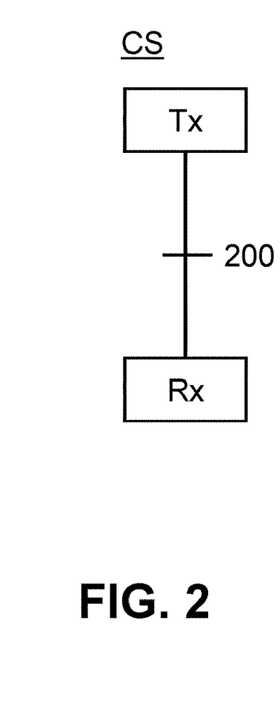
FIG. 2 is a schematic drawing illustrating an exemplary functional transmitter-receiver system.

FIG. 2 illustrates an exemplary functional communication (sub)system CS, in which Tx represents a transmitter and Rx represents a receiver. The transmitter Tx is capable of transmitting a signal to the receiver Rx over an interface 200. The interface may be, for instance, a wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 2 may respectively also comprise the functionality of the Rx and Tx. The transmitter Tx and receiver Rx may be implemented in any device such as a base station (eNB, AP) or terminal (UE, STA), or in any other entity of the communication system CS. A device such as a base station or terminal may implement both Rx and Tx. The present disclosure is not limited to any particular transmitter Tx, receiver Rx and/or interface 200 implementation. However, it may be applied readily to some existing communication systems as well as to the extensions of such systems, or to new communication systems. Exemplary existing communication systems may be, for instance, the 5G New Radio (NR) in its current or future releases, and/or the IEEE 802.11 based systems such as the recently studied IEEE 802.11be or the like.

The spectrum occupancy of the present disclosure in some embodiments is based on using previous occupancies, arranged in time-frequency grids, along with spatial correlations of such occupancies to predict future spectrum occupancy states. This may be achieved, for example, by training trainable models to predict occupancy probability for time-frequency occupancy grids. The designed trainable models may account for the time-frequency correlation. The predicted (occupancy) probabilities of the grids corresponding to users in the vicinity of the user of interest are predicted likewise. Such probabilities may then be concatenated into a unified probability feature vector. This vector accounts for spatial information, and is fed to a (simple) end-classifier to produce the final eventual prediction of the next future occupancy status, e.g. for the user of interest. It is noted that the deep learning and classifier models may be trained over real-world data obtained through measurements, and then they are readily usable for spectrum prediction.

Deep learning refers to trainable models with more than one layer. Machine learning refers to trainable models with any structure comprising the layer structure applying one or more layers. The models may be embedded in functional and/or physical modules. Accordingly, when referring herein to a trainable module, what is meant is a functional module which implements a trainable model such as machine learning or deep learning or other kinds of models.

An example usage of the proposed method is predicting spectral opportunities in an LTE spectrum based on practical spectrum measurements. First, the method is operated in a training stage, where deep learning models are configured and trained. Then, it is operated in a testing stage where spectral opportunities are predicted.

Figure 3:
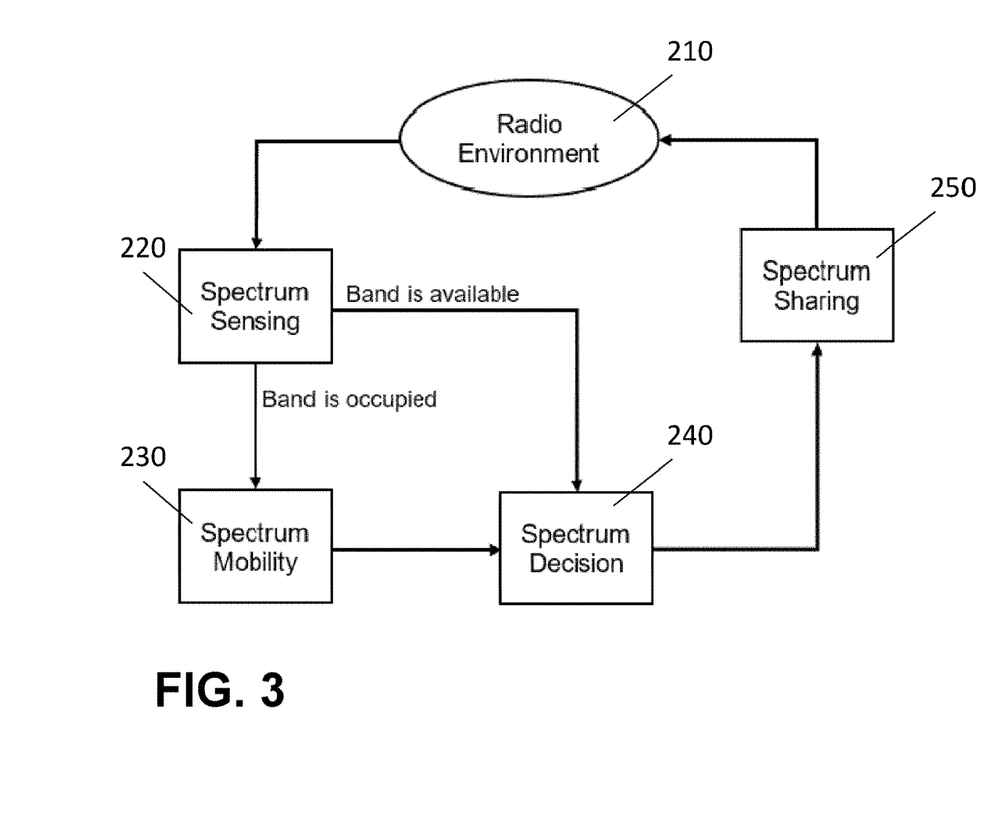
FIG. 3 is a flow diagram illustrating an exemplary spectrum management method.

One of the non-limiting applications of the spectrum occupancy prediction is for radio resource management and/or spectrum allocation purposes in some wireless networks such as mobile communications networks (e.g., 4G, 5G, 6G, or the like) or wireless local area networks (WLAN). In general, the spectrum occupancy prediction may be utilized in cognitive radio systems. FIG. 3 shows an example use of spectrum sensing in cognitive radio. Radio environment 210 may be formed by a plurality of BSs and UEs and/or other entities, e.g. as shown in FIG. 1. One or more of the entities may then perform spectrum sensing 220. Spectrum sensing is a procedure in which before any device transmits a signal, it listens (detects) whether or not another device is already transmitting. Such an approach may be particularly useful in spectrum parts, which may be used by different systems such as unlicensed spectrum parts, which may be used by WLANs as well as by cellular systems or other systems. If the band for transmission is detected in step 220 as available, it may be decided to use the spectrum for the transmission in step 240. If the spectrum is not available in step 220, then a different spectrum may be selected for utilization in step 230. Thereby, the spectrum may be shared 250 in an efficient manner and the spectrum utilization information may be further considered by the radio environment 210. Here, the spectrum occupancy prediction may be performed by the radio environment in order to select the spectrum to be sensed based on the result of the prediction.

According to some embodiments, a method for prediction of spectrum occupancy is provided. The method comprises the step of predicting, by applying a first trainable module, a first likelihood of spectrum occupancy in a wireless bandwidth based on past spectrum occupancy related to a first communication device. The first trainable module may be a machine learning (ML) module. In general, the present disclosure may work with any model-based first module.

Some examples of ML modules may be deep learning (DL) modules or the like. For example, the trainable module may comprise a neural network such as a convolutional neural network or a long short-term memory network or a multi-layer perceptron. The trainable module may comprise a combination of two or more of a convolutional neural network, a long short-term memory network a multi-layer perceptron, and other trainable models.

The likelihood may be predicted (estimated) in any resolution. In general, the likelihood may be binary (occupied/not occupied) or may be a soft value, meaning that it can have more than two possible values. The wireless bandwidth may be any bandwidth, such as the smallest allocable bandwidth unit, or its multiple, or the like. The term "past spectrum occupancy" refers to the occupancy value in time instances before the prediction, i.e., known at the time of prediction. The past spectrum occupancy related to a first communication device, may be understood as the past spectrum occupancy measured at the first communication device and/or by the first communication device and/or determined otherwise for the first communication device (e.g., bandwidth usable by the first communication device measured by another device). It is noted that the past spectrum occupancy does not necessarily have to be directly measured. It is conceivable to measure the occupancy on a subset of the bandwidth, e.g., on some regularly or irregularly spaced bandwidth portions and interpolate or extrapolate the spectrum occupancy in other parts of the system bandwidth. Similarly, the past spectrum occupancy may be obtained directly by measurement, or determined or supplemented by interpolation or extrapolation.

The first communication device may be any device, as is mentioned above, e.g., an AP or a gNB, or even a UE or a STA, or the like.

The method further comprises the step of predicting, by applying a second trainable module, a second likelihood of spectrum occupancy in the wireless bandwidth based on past spectrum occupancy related to a second communication device. The predicting may be performed in the same way as described above for the first trainable module. In fact, the first and the second trainable modules may operate in the same way. However, the present disclosure is not limited to such similar design of the first and the second trainable module. In general, the modules may be different. The first and the second trainable modules may be implemented in the same device. However, they may be implemented in different devices. For example, the first and the second communication devices respectively may implement these modules. However, the present disclosure is not limited thereto and the first and the second trainable modules may be implemented in a single device, which may be one of the first communication device and the second communication device or another device, different from both.

Here the terms "first" and "second" are mere labels to distinguish different instances or types of the trainable modules (a first, a second). It does not imply any sequence or order in any domain. In particular, it does not pose any requirements on the time sequence in which the training or operation of the modules is to be performed.

The method further comprises predicting, by applying a trainable output module, spectrum occupancy in the wireless bandwidth based on the first likelihood and the second likelihood. It is noted that the trainable output module may apply machine learning, or other types of adaption. It may comprise neural network(s) such as CNN or LSTM, or recurrent networks or the like, similarly to the above-mentioned first and second trainable modules. Thus, the output of the first trainable module and the second trainable module may be connected to the input of the trainable output module. In addition to the input from the first trainable module and the second trainable module, the trainable output module may receive further information such as a spatial correlation between the first communication device and the second communication device. However, the present disclosure is not limited to such input information. For example, if the first communication device and the second communication device are not mobile, e.g., base stations or APs, then the positional information may be known and dealt with by training. On the other hand, if the first communication device and/or the second communication device are mobile, then information relating to their mutual position or position relative to some other location may improve the accuracy of the predictor. There may be more than the first trainable module and the second trainable module.

For example, the predicting of the first likelihood and/or the predicting of the second likelihood for a first subband of the wireless bandwidth is further based on frequency occupancy in a second subband of the wireless bandwidth different from the first bandwidth. Thereby, correlation in the frequency domain may be exploited in addition to exploiting correlation in the time domain (given by utilizing the past spectrum occupancy). In general, the first likelihood may be estimated based on the previously measured time-frequency grid occupancy, i.e., on both temporally and frequency adjacent spectrum occupancies (previous occupancies and/or occupancies measured for neighboring or other subbands located close to the subband to be estimated). However, it is also conceivable that the first and second predictions are performed based on correlation in the frequency domain without utilizing the time domain.

According to an exemplary implementation, the method comprises the step of inputting to each of the first trainable model and the second trainable model a spectrum occupancy vector for a predetermined time instant. In the spectrum occupancy vector, each vector coordinate (vector element) is associated with a subband of the wireless bandwidth. For example, the association may be a one to one association. A value of said vector coordinate may indicate whether (or not) the associated subband was occupied at the predetermined time instant. The subband occupancy value may be binary, i.e., indicating one of two states occupied/non-occupied. However, other implementations are conceivable, in which the measured or otherwise determined subband occupancy has a non-binary value, e.g., reflecting the degree of occupancy. Such indication may be of advantage, e.g., in implementations, in which only parts of the subband were occupied or in which occupancy per time interval is determined and the occupancy may vary within the interval. In other words, the non-binary (capable of taking one of more than two values) subband occupancy values may be advantageous in cases in which the subband and the time interval observed are larger than the minimum allocable subband/time interval (such as physical resource block in 4G/5G systems).

Figure 4:
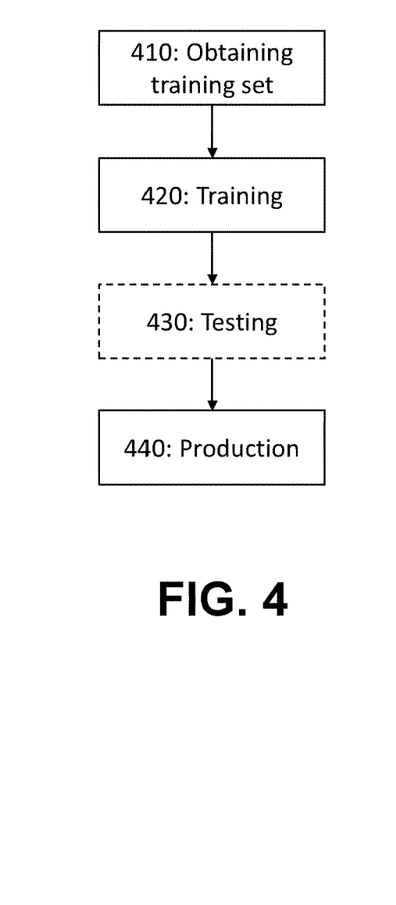
FIG. 4 is a flow diagram illustrating phases of an exemplary trainable system.

In general, with trainable models, there may be several phases involved. FIG. 4 shows these phases. In the first phase 410, the data set for training the trainable model(s) is acquired. In a second phase 420, the trainable model(s) is/are trained by inputting the training data set acquired in phase 410. In the third phase, the trainable model(s) is/are tested. The testing enables evaluating the accuracy of the model. If the accuracy is not sufficient, step 420 and possibly also 410 may be repeated. A fourth phase 440 is the production phase in which the trained model(s) is/are employed for the spectrum occupancy prediction. In the following, exemplary detailed implementation is described for all four phases.

Training Set Data Preparation 410

Training set may be obtained by various different ways. For example, it may be obtained by collecting data from an existing and operating communication system or it can be obtained by simulating the communication system and obtaining the data based on the simulations or the like.

Utilization of the real data from an operational and operating communication system provides the advantage of a closer adaption of the trainable modules to the real operation.

For example, the training set may be obtained as follows. Measurements of the power spectral density (PSD) are acquired as a function of frequency, time, and space along with the ground-truth binary occupancies. Ground-truth binary occupancies are occupancies, which were determined based on measured PSD at the time (interval) and in the frequency (sub)band by a device at a certain location (defining the space parameter). The measurements may be obtained by a plurality of devices, thus providing more space instances. The measurements may be obtained by the same device at multiple locations at different times.

The binary occupancies can be obtained by thresholding the PSD measurements with respect to a specific threshold. In some embodiments, the threshold is adjusted in accordance with the power of the thermal noise. The noise level may be determined by a measurement or estimated as is known in the art. However, a margin of 3 dB may be considered, in addition, for determining the final threshold value to account for any unforeseen effects and variations. If the measured PSD in a certain frequency band is above this threshold, (exceeds the threshold), then this frequency band is reported as occupied. If on the other hand, the measured PSD in the frequency band is below or equal to the threshold, the frequency band is reported (determined) as not occupied.

It is noted that the threshold setting may be performed in the same way as in a communication device such as STA or AP (in general a base station and a terminal) when performing the listen before talk procedure. Also, the measurements may be performed in a similar way as when the listen before talk (LBT) procedure is performed. The LBT procedure may be specified in a standard for some systems.

In order to estimate the spectrum occupancy, spectrum occupancy at one or more time instances (in one or more time intervals) may be considered. Moreover, frequency subband correlation may also be exploited by taking into account one or more adjacent subbands in the proximity of the subband for which the occupancy is estimated. In order to provide the training data, which enable training of the corresponding modules, the one or more past/adjacent subband occupancies should be available within the training data. In other words, in order to predict a sample of spectrum occupancy at a certain frequency (in a certain frequency band) at a given time (in a given time interval), a grid of one or more occupancy samples from adjacent time instances (intervals) and frequency bands may be used. Accordingly, input and output data required for training may be obtained as follows.

A sliding window sweeping the time and frequency axes may be used to form a sample. For example, if the length of the sliding window is set to 7 (in both time and frequency domain in this example), then each input will have a 7×7 matrix of binary occupancies acquired for seven past times and seven adjacent (sub)bands for a given sample (occupancy) to be predicted. This matrix will sweep time and frequency axes. Accordingly, for each sample occupancy to be predicted, there will be a different group (matrix) of the occupancies. The groups may be partially overlapping for neighboring samples to be predicted (due to the sliding window).

The output data for the input of the location of the sample to be predicted and the matrix is the PSD value in the medial frequency value for the upcoming time interval, which is to be predicted. In other words, the output is the predicted sample. According to this setting, PSD measurements may be collected in a 2D shape representing time and frequency as an input dataset for each communication device.

It is noted that the present disclosure is not limited to PSD as the measured parameter. Rather, RSSI or other parameters indicative of signal presence may be determined instead of or in addition to the PSD.

The above-mentioned example is not to limit the present disclosure. In general, the training data may be acquired which comprises for each spectral occupancy to be predicted N spectrum occupancy matrices (or, in general, tensors) corresponding to N trainable modules of respective N communication devices. A q-th spectrum occupancy in the wireless bandwidth is obtained by detecting the spectrum occupancy by a q-th communication device. Here, the q-th spectrum occupancy may correspond to the measured spectrum occupancy such as the matrix of spectrum occupancies mentioned above. It is noted that the spectrum occupancy may be acquired/used as a binary value or as the measured parameter directly, which may be also considered to be indicative of the likelihood of spectrum occupancy (at a given time and frequency). The matrix may be, in general any K1×K2 matrix, with K1 being the number of time instances (intervals) for which the measurement is performed and K2 being the number of frequencies (frequency bands) for which the measurement is performed. However, it is noted that in general, the measurement does not have to be performed for each combination of time and frequency among the K1×K2 matrix elements. It is conceivable that measurements are only performed for a subset of the matrix (in a general grid on which the matrix is a sliding window) elements and that the remaining values are interpolated.

Training 420

According to some embodiments, a method is provided for training of a predictor for prediction of spectrum occupancy, the model comprising a N trainable modules and a trainable output module.

Figure 6:
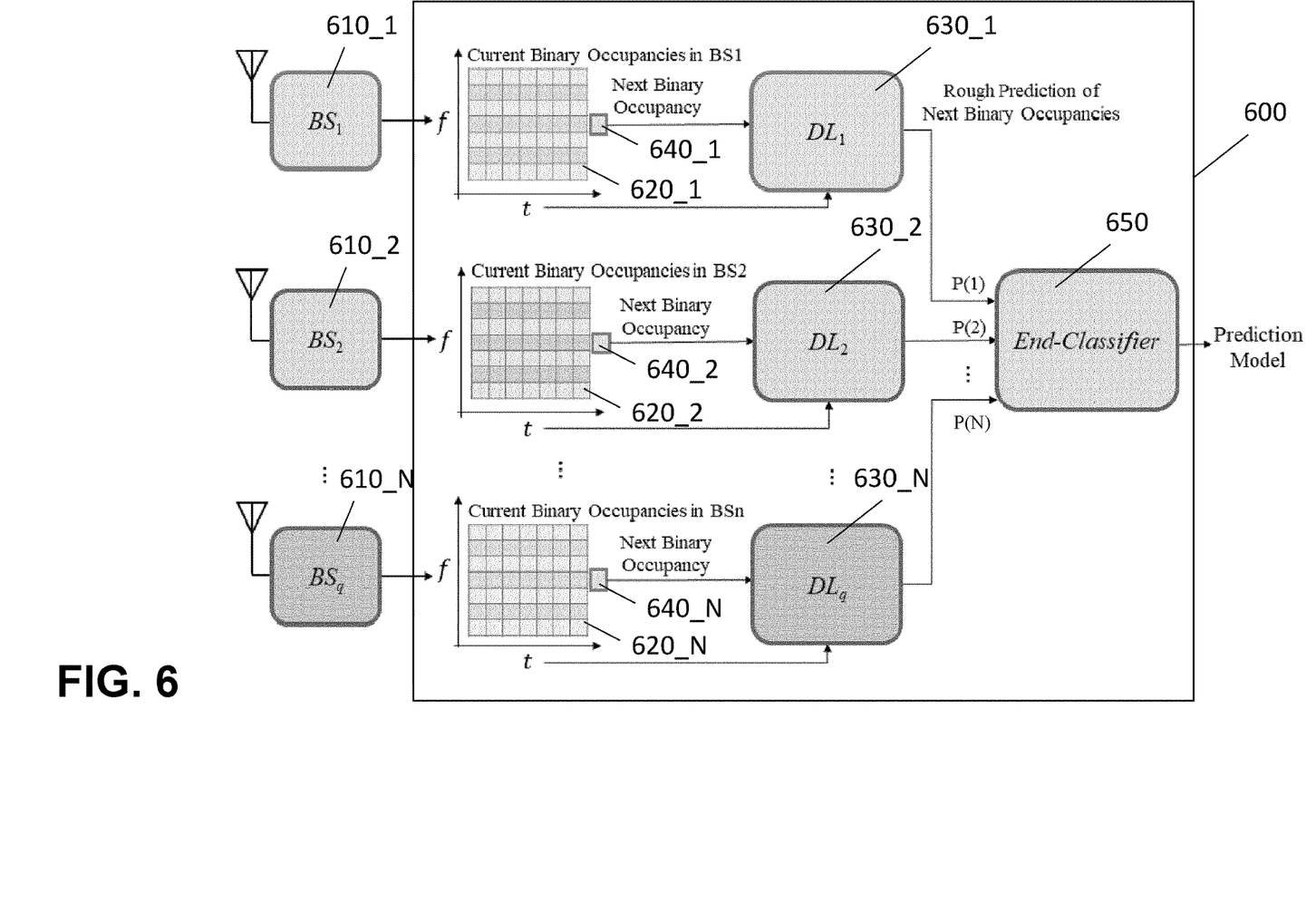
FIG. 6 is a schematic drawing illustrating an example of a training phase.

The method is illustrated in FIG. 6. In this particular example each of N base stations 610_1, 610_2, ... 610_N performs the measurement and outputs a pair of a next binary occupancy and a matrix of past occupancies. This corresponds to the training data described above. It is noted that the "next binary occupancy" is a measured value, which represents the ground truth, i.e. the sample to be predicted in the test phase or the prediction phase, but known (e.g., measured) in the training phase. The matrices 620_1, 620_2, ..., 620_N represent the respective sliding window matrices described above and provided by the respective N base stations. These are matrices which may cover the same band/time for which the occupancy is to be predicted. Thus, the occupancy prediction for one BS may be improved by considering occupancy predictions of another one or more BSs and their spatial relation (correlation). In general, the sliding window size (matrix dimension) may differ for different base stations. Nevertheless, providing the same matrix size may permit a somewhat less complex implementation.

The ground truth value can be delivered together/within the matrix grid. In FIG. 6, the ground truths 640_1, 640_2, . . . , 640N represent the same occupancy value—the N base station should measure/determine the same value. However, due to some errors, the values may differ. It is noted that the present disclosure may also operate if the ground truth 640_1, 640_2, . . . , 640N all are equal to 640_1, e.g. the ground truth used for training is the ground truth obtained (measured) by the base station for which (and possibly by which) the occupancy prediction is performed. The format/structure of the data (2D matrix, vector, or tensor) is only exemplary for better presentation in FIG. 6 and is not to limit the present disclosure.

In other words, the method comprises obtaining, for each q being 1 to N with N being an integer larger than 1, a q-th pair of spectrum occupancy likelihood 620_1, 620_2, . . . , 620_N in a wireless bandwidth related to a q-th communication device and a ground-truth spectrum occupancy 640_1, 640_2, . . . , 640_N in the wireless bandwidth. Then, the method comprises a step of training each q-th trainable module among N trainable modules 630_1, 630_2, . . . ; 630_N with the q-th pair. In this example, the trainable modules are deep learning modules. The trainable modules may be trained sequentially or in parallel. In general, they may be trained independently from each other.

The method then performs training of the trainable output module 650 with the outputs of the N trainable modules 630_1, 630_2, . . . ; 630_N and the ground-truth spectrum occupancy. The ground truth occupancy may be the same ground truth occupancy provided by one of the base stations (e.g. 640_1 as mentioned above). It is noted that the ground truth may be obtained by means other than measurement. E.g., it could be known in case of preparing the training data by simulations (pre-set by the simulation algorithm) or in case of availability of the information about the actual spectrum usage (e.g., based on scheduling or through measurements).

The trainable output module is referred to in FIG. 6 as an end-classifier. In this example, based on the input of the N estimated spectrum occupancy likelihoods P(1), P(2), . . . , P(N), the end classifier is trained to output the spectrum occupancy in the test/production (inference) phase. The spectrum occupancy likelihoods (probabilities) P(1), P(2), . . . , P(N) may be embedded in a vector and provided to the end classifier. However, it is noted that the present disclosure is not limited to any particular form or the end classifier input. For example, the trainable module of each base station may provide a vector of probabilities for each possible outcome (e.g., probability of an occupied state and probability of the non-occupied state). These may then be embedded in a matrix (or the matrix may be vectorized) and provided to the end classifier.

The result of the training phase is the trained modules comprising the N trainable modules 630_1, 630_2, . . . ; 630_N and the trainable output module 650. This is referred to as the "prediction model" in FIG. 6.

The prediction model in FIG. 6 estimates roughly at first the spectrum occupancy separately at the plurality of the communication devices, here base stations. Then, the estimated (predicted) spectrum occupancy is determined by the end classifier 650. An advantage of such model architecture is that if one of the N trainable modules is not working or not used, the remaining trainable models do not need to be re-trained. Only the end-classifier should be re-trained, or its weights set to some pre-trained weights.

In the above-illustrated example, the deep learning architecture 600 is configured to have a total number of N models, where N denotes the number of spatially-correlated users, and each model corresponds to a time-frequency occupancy grid. As mentioned earlier, this configuration simultaneously incorporates space correlation, as well as time, frequency or time-frequency correlations. Each deep learning model is trained over a set of pairs of a given time-frequency occupancy grid and the corresponding ground-truth occupancy status. Each deep learning model calculates a probability of occupancy. The probabilities of occupancy of all N models are augmented to form an occupancy probability feature vector. The vector form may provide the advantage of applying a 1D end classifier. However, it is not to limit the present disclosure, which may also work with higher-dimension classifiers and thus, other forms of input data.

The occupancy probability vector, along with the true occupancy state form the training data pair of the end-classifier to incorporate space correlation. The true occupancy state may be obtained as described above. The end classifier 650 is trained over the aforementioned data pair.

It is noticed that the training may be performed by means of model-based learning such as machine learning or deep learning, which may apply a backpropagation algorithm or other learning algorithms. The present disclosure is not limited to any specific learning model or approach.

It is noted that the learning does not have to be performed sequentially pair by pair. In the above example, there were output samples corresponding to each of the input samples. For example, an input matrix 620_1 represents the input and the predicted occupancy 640_1 represents the output in the first trainable module 630_1. To find the other outputs (for other time instances or time-frequency instances), a different sliding window (matrix) of past occupancies as an input is needed. However, the present disclosure is not limited to such kind of learning. Alternatively, all desired output values (e.g. occupancies predicted for all frequency subbands of one time instant) for time and frequency correlations can be found simultaneously with only one input by using an approach like multi-task learning. In Y U, Lixing, et al. *Spectrum availability prediction in cognitive aerospace communications: A deep learning perspective. In Proc. Cognitive Communications for Aerospace Applications Workshop (CCAA). IEEE*, 2017. p. 1-4, the authors use a similar approach to utilize this time and frequency correlations.

Testing 430 and Production Phase 440

The testing and production phases operate in the same way, but they typically have a different aim. The aim of the test phase is to test how well the trainable system 600 is trained, i.e. performance. This may be performed by means of calculating come performance criteria, such as accuracy or other criteria such as proportion of false positive and false negative classification results, or the like. The aim of the production phase is to produce results (spectrum occupancy prediction) in real situations.

Figure 5:
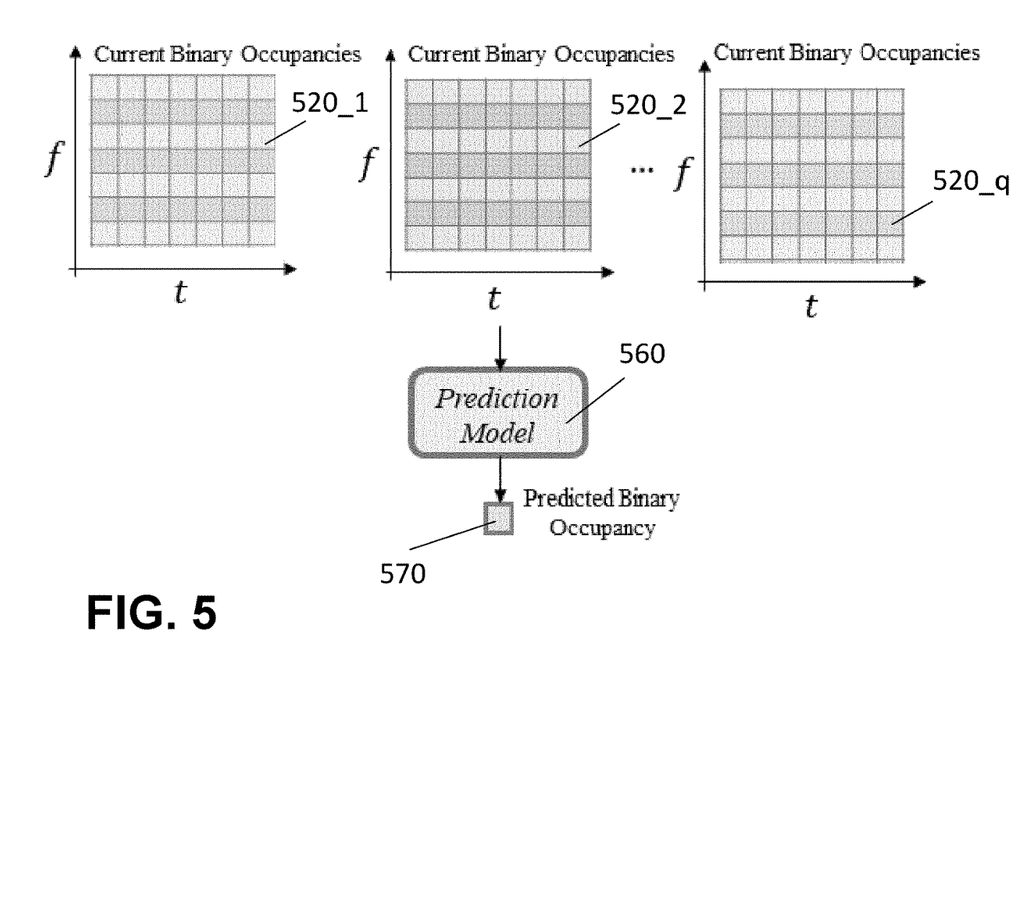
FIG. 5 is a schematic drawing illustrating an example of a testing/production phase.

The operation of this stage is illustrated in FIG. 5, and comprises the following procedure. Previous (past) time-frequency grids 520_1, 520_2, . . . , 520_N are filled with their occupancy values. This filling of the grid may be performed by measuring some parameter, which is indicative of signal presence such as PSD or RSSI or the like. Each such grid is passed to its respective deep learning model to predict the corresponding occupancy probability. The predicted spectrum occupancy probabilities are then entered into the prediction model 560. The prediction model 560 is obtained by training the end classifier 650 as described above. Unlike in the training phase in which the parameters of the classifier (trainable model) are adapted to the training data set, in the production phase, the parameters of the classifier may remain the same, as trained. Analogously to the setting in the training stage, the predicted probabilities are augmented (embedded) in the shape of an occupancy probability vector comprising values (P(1), P(2), . . . , P(N)) provided by the trainable models for the respective base stations. The occupancy probability vector is then provided as an input to the end classifier. It is noted that, as mentioned above, it is conceivable to provide a plurality of likelihood values per base station.

This setting allows for exploiting multidimensional correlation at reduced computation cost, as compared to some known tensor-based methods. Moreover, splitting the setting to have N deep learning models alleviates the need for continuous availability of user information required by tensor-based methods.

The occupancy probability vector is then entered to the prediction model 560 to obtain the prediction of a corresponding sample occupancy (predicted binary occupancy) 570. In other words, the predicted occupancy probability vector is fed to the end-classifier to yield the eventual occupancy prediction.

In some embodiments, the first communication device is a base station (such as 620_1), the second communication device is a base station (such as 620_2), and the prediction by the trainable output module relates to a third communication device which is a user equipment. The method may further comprise selecting the first communication device and the second communication device based on their relative position to the third communication device. For example, to predict spectrum occupancy of spectrum available to the third communication device, the base stations are selected to cope with some predefined criteria on the relative position between the base stations and the third communication device.

It is noted that while this architecture may be readily implemented in a communication system, it is in principle not necessary to have the first communication device and the second communication device as/in the base station. They may be more simple devices such as spectrum analyzers and do not need to implement the functions of network access for terminals.

For example, the relative position between a base station and a user equipment is determined based on at least one of a number of handovers between the base station and the user equipment; channel quality between the base station and the user equipment; and spatial distance between the base station and the user equipment. The number of handovers is beneficial as it reflects not only channel quality (power) but also the motion pattern of the user equipment (terminal, which may be UE or STA, or any other end device). The channel quality is an important factor for efficient spectrum allocation.

In an exemplary implementation, the first communication device is a user equipment, the second communication device is a user equipment, the prediction by the trainable output module relates to the first communication device. The method may further comprise selecting of the second communication device based on its relative position to the first communication device. For example, the first communication device may be a STA1 in a WLAN system and the second communication device may be a STA2 in the WLAN system. The trainable output module estimates the spectrum occupancy for STA1. In order to do so, it evaluates (obtains as an input) past occupancies from STA1 and from a STA2 which it selects as one of STAs in the proximity of STA1. In order to determine STA2, the predicted position of STA1 in the future may be used. The trainable output module may be implemented by an AP or by one of the STAs. It may be advantageous to perform the learning at a base station (AP). A base station may have more information, its power consumption is not so critical, and they may be capable of handling complex processes.

In some embodiments, the method further comprises performing resource management for the first communication device, the second communication device and/or the third communication device according to the spectrum occupancy predicted by the third prediction. Radio resource management may comprise resource allocation or scheduling or the like. In particular, the resource management may comprise cognitive radio tasks.

Even though above, an example with two base stations was presented, in general, the method may comprise N steps of predicting, wherein each q-th step, q being one to N, comprises applying an q-th ML module to predict a q-th likelihood of spectrum occupancy in the wireless bandwidth based on past spectrum occupancy related to a q-th communication device, N being an integer larger than 2; and the step of the predicting, by applying the output ML, spectrum occupancy in the wireless bandwidth is based one ach q-th likelihood. The first trainable model, the second trainable model, and/or the trainable output model are at least one of a convolutional neural network, multi-layer perceptron, long-short term memory, or recurrent neural network. As mentioned above, there are many further possible variants and the present disclosure is not limited to any particular architecture of the trainable modules.

EXAMPLES

A device capable of performing functions of the above-explained method can be implemented in various different ways. For example, it may be implemented on a software defined radio (SDR) platform, where deep learning may be carried out on FPGAs. For instance, Universal Software Radio Peripheral (USRP) can be used for this purpose. The main components of such a device may comprise USRP modules (BS and UE), PC to program the USRPs, antennas, clock synchronization modules, vector spectrum analyzer for spectrum measurements and for training purposes and possibly further functional elements.

Figure 7:
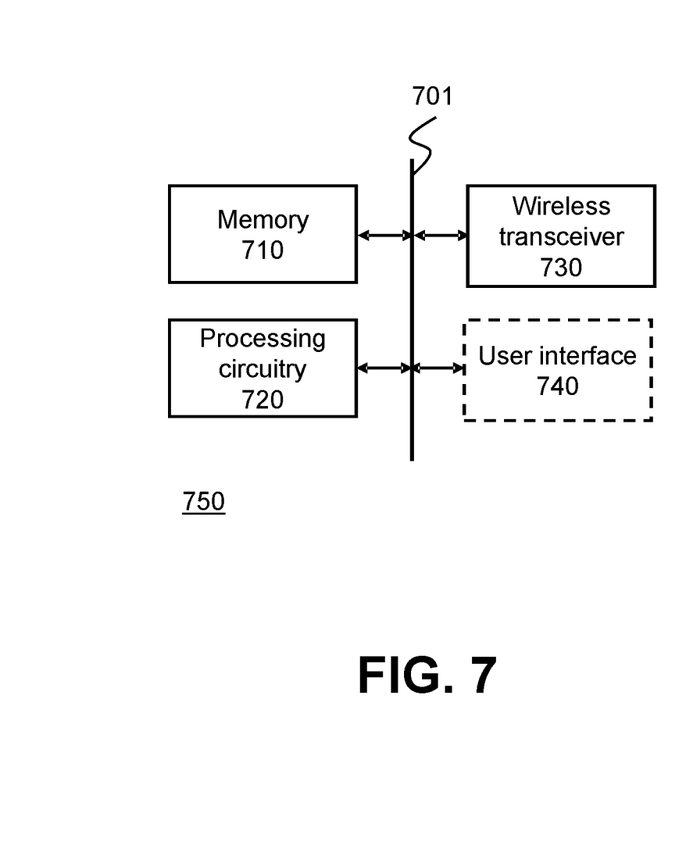
FIG. 7 is a block diagram illustrating parts of a communication device.

Moreover, FIG. 7 shows an exemplary device 750, which may implement some embodiments of the present disclosure. For example, the device may be a device for spectrum occupancy prediction. Such a device may comprise memory 710, processing circuitry 720, a wireless transceiver 730, and possibly a user interface 740. The device may be, for instance a (part of) a base station or a terminal/STA, or another device as mentioned above.

Figure 8:
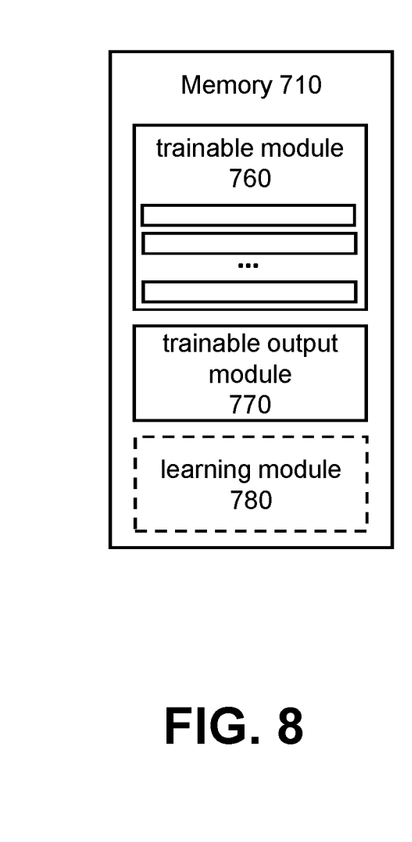
FIG. 8 is a block diagram illustrating parts of the memory of the communication device.

The memory 710 may store the program, which may be executed by the processing circuitry 720 to perform steps of any of the above-mentioned methods. The processing circuitry may comprise one or more processors. The wireless transceiver 730 may be configured to receive and/or transmit wireless signals. The transceiver 730 may comprise also baseband processing which may detect, decode and interpret the data according to some standard or predefined convention. For example, the transceiver may be used to perform measurement, communicate with other devices such as base stations and/or terminals. The device 750 may further comprise a user interface 740 for displaying messages or status of the device, or the like and/or for receiving a user's input. A bus 710 interconnects the memory, the processing circuitry, the wireless transceiver, and the user interface. FIG. 8 shows an example of the memory 710, comprising a trainable module 760, a trainable output module 770 and a learning module 780. The trainable module 760 may be comprised in the device to predict, based on its own past occupancies, the next occupancy. In some embodiments, the same device may also comprise modules for predicting the next occupancy for other devices, e.g. based on data received from such other devices. The trainable output model corresponds to the above-described end classifier. The learning module may enable for the training of the trainable module 760 and/or of the trainable output module 770. These modules 760-780 may be fetched from the memory and executed by the processing circuitry.

The above examples are not to limit the present disclosure. There are many modifications and configurations which may be used in addition or alternatively, as will be briefly described below.

As mentioned above, PSD measurement may be used to estimate spectrum occupancy. The received signal strength indicator (RSSI) can be used instead of PSD. RSSI is available effortlessly in most communication devices and can give a rough quantification of user activity, i.e., spectrum usage. In some known communication systems, RSSI measurements are performed already for various different purposes, so usage of the RSSI makes use of already performed measurements. The collected measurements may be measurements which are collected and performed by a base station. However, they may also/instead come from terminals connected to the base stations and reporting measurements to those (one or more) base stations. In general, a simple device such as a spectrum analyzer may perform the measurements and provide them for the occupancy prediction.

In the above embodiments, when estimating spectrum occupancy at a certain base station (e.g. for terminal(s) served by the base station) the spectrum occupancy of the spatially related base stations is considered (see base stations 610_1, 610_2, . . . , 610_N.

The spatial relation may be geographic distance, or a geographic distance with some constraint on the operator or communication system (capabilities) of the base station, or the like. Other criteria for defining what a neighboring base station is are also possible. For example, the base station having the maximum number of handovers between itself end the certain base station may be considered as a neighboring base station. There may be a plurality of such base stations selected as adjacent base stations to be considered for spectrum occupancy prediction. Another possibility of defining neighborhood is the count of edge users with the certain base station, i.e. users, which are located in the coverage of both base stations and at the edge of the certain base station coverage. These and other criteria may be used and combined, for a certain base station, the adjacent one or more base stations of which the time-frequency occupancy measurements are used to estimate the spectrum occupancy for a certain base station.

There are many options for configuring the end-classifier. In the above-mentioned embodiments, the end classifier 560 was fed with a vector of spectrum occupancy probabilities from the N trainable modules processing occupancies of the respective N communication devices (e.g., base stations). The time-frequency grid portion (referred to above as a sliding window or matrix) may have different 2D shapes and dimensions of the time-frequency grid, such as square, rectangular or cellular grid. Rather than augmenting the occupancy probabilities in the shape of a vector to be fed to the end-classifier, other sorts of augmentation may be considered. For example, they can be shaped as another 2D grid, at the expense of a multi-dimensional end-classifier.

To obtain the proposed trainable models either generic machine learning or deep learning models can be used. One of the key advantages of deep learning is that it may work on raw data, thereby alleviating the need for feature extraction/crafting/engineering. Conversely, generic (shallow) machine learning may excel in its simpler structure, working well with suitable distinctive features. With the availability of such features, machine learning may provide more advantages than deep learning. Since deep learning may alleviate the need for human-based feature extraction/crafting/engineering, it is possible to apply the above described methods directly to real-world measurements without doing any binary thresholding. Conversely, the "deep" attribute of the used machine learning may be reduced at the cost of adding more feature extraction. In some embodiments, one may avoid deep learning and use machine learning or model-based learning which may be advantageous especially if it is possible to extract distinctive features.

The embodiments and examples of the present disclosure comprise the possibility of achieving high prediction accuracy: thanks to exploiting time, frequency and space correlations simultaneously. Moreover, the proposed setting is easily extendable to exploit other correlations in other domains such as angular or code domain. The extension would merely comprise the provision of tensors with higher dimensions (e.g., an D-dimensional grid instead of a 2D grid, in other words a D-dimensional tensor rather than a 2D matrix).

Realizing prediction with moderate computational complexity may be possible thanks to the decentralized approach of dividing the problem into smaller problems. This allows for real-time operation on network devices with limited computational capabilities. For example, as mentioned above, the N trainable modules may be trained separately from each other. The end classifier may be trained independently of training the N trainable modules. The decentralized approach may further provide some improvement of robustness against the absence of data from some of the base stations: The decentralized training allows for ignoring those one or more base stations with no available data. This is advantageous for the continuity of the prediction, i.e. the spectrum occupancy prediction may work even in case of failure of a base station (in general, communication device) or channels between the base stations or the like.

The embodiments and examples described herein are readily applicable as an integral part of cognitive radio spectrum sharing (cf. FIG. 3). This comes under the scope of intelligent resource management. It is noted that the present disclosure can be applied in a wide range of communication systems comprising cellular systems and wireless LANs or any ad-hoc networks, and in particular in environments in which multiple systems operate in the same bandwidth or the like. For example, the present disclosure is applicable for systems beyond 5G for spectrum prediction for integrated satellite-terrestrial networks (ISTNs) toward beyond fifth-generation (B5G) wireless systems benefiting from both satellite and terrestrial systems. In this usage, the spectrum scarcity is of notable severity against this technology, which may be improved by applying spectrum sharing concepts utilizing the present disclosure.

The present disclosure may further be applied in B5G spectrum prediction for Internet of Things (IoT) terminals in the environment of satellite-based IoT networks and/or spectrum prediction for dynamic spectrum access in LPWAN (low power wide area network) and LoRa (low range) networks in 5G and B5G.

Another possible deployment for the present disclosure is in 5G enhanced mobile broadband (eMBB) requires large bandwidths. Database-assisted techniques can add supplemental frequency resources to the licensed band operation that is essential for eMBB. Also, other methods such as license-assisted access (LAA) may be used to enhance capacity. In addition or alternatively, the present disclosure may be applied in 5G massive machine type communication (mMTC) requires large coverage and good signal penetration through walls and other obstacles, which mean access to frequency spectrum below 1 GHz. Predictive techniques can assist in finding the most suitable time slots for low data rate transmissions.

Another possible application is 5G Ultra-reliable low latency communications (URLLC) which require the use of licensed spectrum. Joint mobility and spectrum prediction can be used, e.g., in assisting the base station selection, minimizing the number of handovers, and improving the quality of vehicle-to-everything (V2X) communications.

The present disclosure is not limited to the above-mentioned approaches. Spectrum Inference for Next-Generation HF Automatic Link Establishment, High-frequency (HF) radio, also known as short-wave radio, operating in the 1.5-30 MHz spectrum band, is now widely used, not only by the amateur community, but also by worldwide governmental and non-governmental agencies as an alternative to satellites for over-the-horizon wireless communications. Typical application scenarios of HF radios comprise ships at sea, aircraft out of range of line-of-sight radio networks, disaster areas where the terrestrial communications infrastructure has been destroyed, and distant regions lacking other communications, to name just a few.

Another attractive application is Opportunistic Spectrum Access for UAV (unmanned aerial vehicles) Communications. This may be relevant, e.g., for navigation and communication between drones and earth control stations or between drones themselves or the like.

Spectrum occupancy prediction of the present disclosure is further usable for sharing between access and backhaul (fixed) links. The term "backhaul" refers to links between base stations (e.g. between gNBs or between APs or the like). The term "access" refers to links between terminals and base stations.

Sharing unlicensed mm-wave spectrum is another application that may make use of the present disclosure: this is related to the recent trend in cellular communication to utilize both the licensed and unlicensed spectrum simultaneously for extending the available system bandwidth. In this context, LTE in unlicensed spectrum, referred to as LTE-U, is proposed to enable mobile operators to offload data traffic onto unlicensed frequencies more efficiently and effectively, and provides high performance and seamless user experience. The integration of unlicensed bands is also considered as one of the key enablers for 5G cellular systems. However, unlike the typical operation in licensed bands, where operating BSs have exclusive access to spectrum and therefore are able to coordinate by exchanging or signaling to mitigate mutual interference, such a multistandard and multi-operator spectrum sharing scenario imposes significant challenges on coexistence in terms of interference mitigation. Licensed Assisted Access (LAA) with listen-before talk (LBT) protocol has been proposed for the current coexistence mechanism of LTE-U. In the case of mm-wave unlicensed sharing a major issue is that the use of highly directional antennas as one of the key enablers for 5G networks becomes problematic for the current coexistence mechanisms where omnidirectional antennas were mostly assumed. Accordingly, an occupancy prediction may help to efficiently manage available resources.

The methodologies described herein may be implemented by various means depending on the application. For example, these methodologies may be implemented in hardware, operation system, firmware, software, or any combination of two or all of them. For a hardware implementation, any processing circuitry may be used, which may comprise one or more processors. For example, the hardware may comprise one or more of application-specific integrated circuits (ASICs), digital signal processors (DSPs), digital signal processing devices (DSPDs), programmable logic devices (PLDs), field-programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer-readable storage medium such as the memory 610 or any other type of storage. The computer-readable media comprises physical computer storage media, which may be any available medium that can be accessed by the computer, or, in general by the processing circuitry 620. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc, or the like. Combinations of different storage media are also possible—in other words, distributed and heterogeneous storage may be employed.

The embodiments and exemplary implementations mentioned above show some non-limiting examples. It is understood that various modifications may be made without departing from the disclosed subject matter. For example, modifications may be made to adapt the examples to new systems and scenarios without departing from the central concept described herein.

Summarizing, methods and techniques are described for spectrum occupancy prediction for a wireless communication. The present disclosure relates to a spectrum occupancy prediction, which employs a first trainable module and a second trainable module. The first and the second trainable modules predict spectrum occupancy at respective first and second communication devices based on past occupancies and/or occupancies in adjacent subband(s). The prediction from the first trainable module and the second trainable module is input to a trainable output (third) module, which then provides the spectrum occupancy prediction.

According to some embodiments, a method is provided for prediction of spectrum occupancy comprising: predicting, by applying a first trainable module, a first likelihood of spectrum occupancy in a wireless bandwidth based on past spectrum occupancy related to a first communication device, predicting, by applying a second trainable module, a second likelihood of spectrum occupancy in the wireless bandwidth based on past spectrum occupancy related to a second communication device, predicting, by applying a trainable output module, spectrum occupancy in the wireless bandwidth based on the first likelihood and the second likelihood.

According to some embodiments, a device for prediction of spectrum occupancy comprising: a first trainable module for predicting a first likelihood of spectrum occupancy in a wireless bandwidth based on past spectrum occupancy related to a first communication device, a second trainable module for predicting a second likelihood of spectrum occupancy in the wireless bandwidth based on past spectrum occupancy related to a second communication device, a trainable output module for predicting spectrum occupancy in the wireless bandwidth based on the first likelihood and the second likelihood. In the device, in an exemplary implementation, the first trainable module and/or the second trainable module and/or the trainable output module are embodied on one or more FPGAs.

For example, the predicting of the first likelihood and/or the predicting of the second likelihood for a first subband of the wireless bandwidth is further based on frequency occupancy in a second subband of the wireless bandwidth different from the first bandwidth.

In some embodiments, each of the first trainable module and the second trainable module is input a spectrum occupancy vector for a predetermined time instant, in which: each vector coordinate is associated with a subband of the wireless bandwidth, and a value of said vector coordinate indicates whether the associated subband was occupied at the predetermined time instant.

For example, the first communication device is a base station, the second communication device is a base station, the prediction by the output trainable module relates to a third communication device which is a user equipment; and the method further comprises selecting of the first communication device and the second communication device based on their relative position to the third communication device.

For instance, the relative position between a base station and a user equipment is determined based on at least one of: a number of handovers between the base station and the user equipment; channel quality between the base station and the user equipment; and spatial distance between the base station and the user equipment.

In an exemplary implementation, the first communication device is a user equipment, the second communication device is a user equipment, the prediction by the trainable output module relates to the first communication device; and the method further comprises selecting of the second communication device based on its relative position to the first communication device.

The method may further comprise performing resource management for the first communication device, the second communication device and/or the third communication device according to the spectrum occupancy predicted by the third prediction. The device may, correspondingly, comprise a resource management module (unit) configured to perform resource management for the first communication device, the second communication device and/or the third communication device according to the spectrum occupancy predicted by the third prediction.

In some embodiments, the method may comprise N steps of predicting, wherein each q-th step, q being one to N, comprises applying an q-th trainable module to predict a q-th likelihood of spectrum occupancy in the wireless bandwidth based on past spectrum occupancy related to a q-th communication device, N being an integer larger than 2; and the predicting, by applying the trainable output module, spectrum occupancy in the wireless bandwidth is based on each q-th likelihood.

In some embodiments of the device, correspondingly, the device comprises N trainable modules. Each q-th trainable module is configured to predict a q-th likelihood of spectrum occupancy in the wireless bandwidth based on past spectrum occupancy related to a q-th communication device, N being an integer larger than 2. The trainable output module is configured to predict spectrum occupancy in the wireless bandwidth based on each q-th likelihood.

For example, the first trainable module, the second trainable module, and/or the trainable output module comprise at least one of convolutional neural network and long-short term memory. Moreover, in some embodiments, the past spectrum occupancy related to the first communication device and/or the past spectrum occupancy related to the second communication device are obtained comprising measuring power spectral density or received signal strength indicator values.

According to some embodiments, a method is provided for the training of a predictor for prediction of spectrum occupancy, the model comprising N trainable modules and a trainable output module, wherein the method comprises: obtaining, for each q being 1 to N with N being an integer larger than 1, a q-th pair of spectrum occupancy likelihood in a wireless bandwidth related to a q-th communication device and a ground-truth spectrum occupancy in the wireless bandwidth; training each q-th trainable module among N trainable modules with the q-th pair; and training the trainable output module with the outputs of the N trainable modules and the ground-truth spectrum occupancy. For instance, a q-th spectrum occupancy in the wireless bandwidth is obtained by detecting the spectrum occupancy by a q-th communication device. For example, the training of the q-th trainable module is performed as a multi-task training for a plurality of subbands at the same time. The corresponding training device is provided, for training of a predictor for prediction of spectrum occupancy, the device comprising N trainable modules and a trainable output module, each q-th of the N trainable modules (with N being an integer larger than 1) is configured to obtain a q-th pair of spectrum occupancy likelihood in a wireless bandwidth related to a q-th communication device and a ground-truth spectrum occupancy in the wireless bandwidth. The device comprises a training module for training each q-th trainable module among N trainable modules with the q-th pair, and for training the trainable output module with the outputs of the N trainable modules and the ground-truth spectrum occupancy. For instance, a q-th spectrum occupancy in the wireless bandwidth is obtained by detecting the spectrum occupancy by a q-th communication device. For example, the training of the q-th trainable module is performed as a multi-task training for a plurality of subbands at the same time.

Moreover, the corresponding methods are provided comprising steps performed by any of the above-mentioned processing circuitry implementations.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit (IC).

Any of the apparatuses of the present disclosure may be embodied on an integrated chip.

Any of the above-mentioned embodiments and exemplary implementations may be combined.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the disclosed subject matter.

For example, it is to be understood that the presently disclosed subject matter contemplates that, to the extent possible, one or more features of any embodiment can be combined with one or more features of any other embodiment.

The invention claimed is:

1. A method for prediction of spectrum occupancy comprising:
    predicting, by applying a first trainable model, a first likelihood of spectrum occupancy in a wireless bandwidth based on past spectrum occupancy related to a first communication device,
    selecting a second communication device based on its relative position to the first communication device,
    predicting, by applying a second trainable model, a second likelihood of spectrum occupancy in the wireless bandwidth based on past spectrum occupancy related to the second communication device,
    predicting, by applying a trainable output model, spectrum occupancy in the wireless bandwidth based on the first likelihood and the second likelihood, and
    performing resource management for the first communication device and the second communication device according to the spectrum occupancy predicted by the trainable output model.

2. The method according to claim 1, wherein the predicting of the first likelihood and/or the predicting of the second likelihood for a first subband of the wireless bandwidth is further based on frequency occupancy in a second subband of the wireless bandwidth different from the first subband.

3. The method according to claim 1, further comprising inputting to each of the first trainable model and the second trainable model a spectrum occupancy vector for a predetermined time instant, in which:
    each vector coordinate is associated with a subband of the wireless bandwidth, and
    a value of said vector coordinate indicates whether the associated subband was occupied at the predetermined time instant.

4. The method according to claim 1, wherein the first communication device is a base station, the second communication device is a base station, the prediction by the output trainable model relates to a third communication device which is a user equipment; and
    the method further comprises selecting of the first communication device and the second communication device based on their relative position to the third communication device.

5. The method according to claim 4, wherein the relative position between a base station and a user equipment is determined based on at least one of:
    a number of handovers between the base station and the user equipment;
    channel quality between the base station and the user equipment; and/or
    spatial distance between the base station and the user equipment.

6. The method according to claim 1, wherein the first communication device is a user equipment, the second communication device is a user equipment, and the prediction by the trainable output model relates to the first communication device.

7. The method according to claim 4, further comprising performing resource management for the third communication device according to the spectrum occupancy predicted by the trainable output model.

8. The method according to claim 1, further comprising N steps of predicting, wherein:
    each q-th step, q being one to N, comprises applying an q-th trainable model to predict a q-th likelihood of spectrum occupancy in the wireless bandwidth based on past spectrum occupancy related to a q-th communication device, N being an integer larger than 2;
    the predicting, by applying the trainable output model, spectrum occupancy in the wireless bandwidth is based on each q-th likelihood.

9. The method according to claim 1, wherein the first trainable model, the second trainable model, and/or the trainable output model comprise at least one of convolutional neural network and/or long-short term memory.

10. The method according to claim 1, wherein
    the past spectrum occupancy related to the first communication device and/or the past spectrum occupancy related to the second communication device are obtained comprising measuring power spectral density or received signal strength indicator values.

11. A method for training of a predictor for prediction of spectrum occupancy, the model comprising N trainable models and a trainable output model, wherein the method comprises:
    obtaining, for each q being 1 to N with N being an integer larger than 1, a q-th pair of spectrum occupancy likelihood in a wireless bandwidth related to a q-th communication device and a ground-truth spectrum occupancy in the wireless bandwidth, wherein one or more of the N communication devices are selected based on their respective relative positions;
    training each q-th trainable model among N trainable models with the q-th pair; and
    training the trainable output model with the outputs of the N trainable models and the ground-truth spectrum occupancy.

12. The method according to claim 11, wherein a q-th spectrum occupancy in the wireless bandwidth is obtained by detecting the spectrum occupancy by a q-th communication device.

13. The method according to claim 11, wherein the training of the q-th trainable model is performed as a multi-task training for a plurality of subbands at the same time.

14. A device for prediction of spectrum occupancy comprising:
    a first trainable model for predicting a first likelihood of spectrum occupancy in a wireless bandwidth based on past spectrum occupancy related to a first communication device,
    a second trainable model for predicting a second likelihood of spectrum occupancy in the wireless bandwidth based on past spectrum occupancy related to a second communication device,
    wherein the second communication device is selected based on its relative position to the first communication device,
    a trainable output model for predicting spectrum occupancy in the wireless bandwidth based on the first likelihood and the second likelihood, wherein the device for prediction of spectrum occupancy is further configured to perform resource management for the first communication device and the second communication device according to the spectrum occupancy predicted by the trained output model.

15. The device for prediction of spectrum occupancy according to claim 14,
wherein the first trainable model and/or the second trainable model and/or the trainable output model are embodied on one or more FPGAs.

* * * * *